3,594,398
METHOD FOR PRODUCING N-FORMIMIDATE
Takeo Saegusa and Yoshihiko Ito, Kyoto, Japan, assignors to Takeda Chemical Industries, Ltd., Osaka, Japan
No Drawing. Filed Jan. 25, 1968, Ser. No. 700,390
Claims priority, application Japan, Apr. 5, 1967, 42/21,756
Int. Cl. C07c 119/00
U.S. Cl. 260—453   4 Claims

ABSTRACT OF THE DISCLOSURE

N-substituted formimidate is prepared in high yield by reacting alcohol with isonitrile with the aid of copper, silver or mercury or oxide of these metals. The thus-obtainable formimidates are useful as agricultural chemicals.

---

This invention relates to a method for producing N-substituted formimide acid esters (hereinafter referred to as N-substituted formimidates).

More particularly, this invention relates to a new method for producing N-substituted formimidate which comprises reacting an alcohol with an isonitrile in the presence in the reaction medium of at least one of copper, silver and mercury, and oxides thereof, as shown by the following reaction formula:

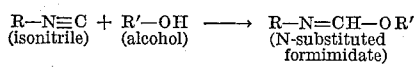

$$\underset{\text{(isonitrile)}}{\text{R—N}\equiv\text{C}} + \underset{\text{(alcohol)}}{\text{R'—OH}} \longrightarrow \underset{\text{(N-substituted formimidate)}}{\text{R—N}=\text{CH—OR'}}$$

Hitherto N-substituted formimidate has been prepared only by subjecting aromatic primary amine and orthoformic acid ester to condensation reaction. This reaction, however, can give an appreciable yield of the product, exceptionally, only when the said amine is aromatic primary amine, and even in this exceptional case the yield is not satisfactorily high; cf. Journal of American Chemical Society 3848, 71 1949: "Acid Catalyzed Reaction of Diarylformamidines with Ethyl Orthoformate" by Royston M. Roberts.

Thus, it is a principal object of this invention to provide a practical and industrially feasible method which is widely applicable to the production of N-substituted formimidate in high yield.

This object is realized by reacting an alcohol with an isonitrile in the presence in the reaction medium of, as a catalyst, at least one of copper, silver, mercury, and oxides thereof.

The use of the above-specified catalyst is essential to the method of the present invention, since in the absence thereof reaction will not take place.

The alcohol, constituting one of the starting materials, can be straight chain or branched, aliphatic or aromatic, and saturated or unsaturated. Such alcohol can have more than ten carbon atoms, but usually those of from 1 to 10 carbons are advantageously applicable to the present invention.

These alcohols can also contain in their molecules such a substituent or substituents as di(lower)alkylamino (e.g. diethylamino, etc.), halogen (e.g. F, Cl, Br), lower alkoxy (e.g. ethoxy, etc.), lower alkoxycarbonyl (e.g. ethoxycarbonyl, β-hydroxyethoxycarbonyl, etc.), cyano(lower)alkoxy (e.g. β-cyanoethoxy, etc.), thio(lower)alkoxy (e.g. β-ethylthioethoxy, etc.), and so on.

Advantageously employed are the lower alkanols (with e.g. 2 to 4 carbon atoms), di(lower)alkylamino(lower)alkanols (such as β-dimethylaminoethanol, etc.), lower alkenols (such as allyl alcohol and the like), and the phenyl(lower)alkanols (such as benzyl alcohol, etc.).

The isonitriles can be aliphatic or aromatic, including aralkyl isonitriles, and are exemplified by alkyl isonitrile with as many as 10 carbon atoms (e.g. ethyl isonitrile, n-propyl isonitrile, i-propyl isonitrile, n-butyl isonitrile, sec-butyl isonitrile, n-pentyl isonitrile, n-hexyl isonitrile, decylisonitrile), cyclohexyl isonitrile, phenyl isonitrile, α-naphthyl isonitrile, phenethylisonitrile, etc.

The said aromatic isonitriles may also be substituted as e.g. p-tolyl isonitrile, xylyl isonitrile, p-nitrophenyl isonitrile, 3,4-dichlorophenyl isonitrile, 2,5-dichlorophenyl isonitrile, p-methoxyphenyl isonitrile, p-diethylaminophenyl isonitrile, etc.

As the catalyst(s), copper, silver, mercury, and oxides thereof are employed solely or in combination of more than one in various ratios, usually in an amount from 0.1 mol percent to 50 mol percent, preferably from 0.1 mol percent to 20 mol percent calculated on the basis of the starting alcohol. The oxides comprise cuprous oxide, cupric oxide, silver oxide ($Ag_2O$), mercurous oxide and mercuric oxide.

The reaction proceeds even with an amount of less than 0.1 mol percent of catalyst(s), but the reaction time will be prolonged, while in case of an addition of over 50 mol percent the same result is obtained as in the addition of from 0.1 mol percent to 50 mol percent.

The reaction can be carried out without any solvent, but it can also proceed in a solvent as aliphatic hydrocarbon, aromatic hydrocarbon, ethers, halogen-substituted hydrocarbon, ester, etc., as long as they do not disturb the reaction.

The optimal reaction temperature varies with kind and amount of starting alcohol, isonitrile and catalyst, in a range of from about —50° C. to about 250° C. but the reaction is usually carried out under heating at a temperature from about 50° C. to about 150° C.

The objective compounds of the present invention are useful for a wide variety of commercial and agricultural purposes, e.g. as lubricant additives, as plasticizers for synthetic resins and plastics, as rubber compounding substances, as herbicides and as fungicides, etc.; cf. inter alia U.S. Pats. Nos. 2,909,553; 2,684,976; and 2,515,878.

The following examples are merely for illustrative purposes, and not to be construed as limitation of the present invention.

In these examples "mm." signifies millimeters, and the term "part" is used on the weight basis.

EXAMPLE 1

A mixture of 3.7 parts of n-butanol, 3.0 parts of cyclohexyl isonitrile and 0.32 part of powdered copper is heated at 120° C. for 5 hours.

After removing the catalyst, the reaction mixture is subjected to distillation under reduced pressure to give n-butyl N-cyclohexyl formimidate boiling at 81° C. (21 mm. Hg) in a yield of 99%.

EXAMPLE 2

A mixture of 2.9 parts of allyl alcohol, 3.0 parts of cyclohexyl isonitrile and 0.32 part of powdered copper is heated at 120° C. for 5 hours. The reaction mixture is then subjected to distillation to give allyl N-cyclohexyl formimidate boiling at 105° C. (32 mm. Hg) in a yield of 95%.

EXAMPLE 3

A mixture of 4.5 parts of β-dimethylaminoethanol, 3.0 parts of cyclohexyl isonitrile and 0.32 part of powdered copper is heated at 120° C. for 5 hours. The reaction mixture is then subjected to distillation under reduced pressure to give β-dimethylaminoethyl N-cyclohexyl formimidate boiling at 85° to 86° C. (5 mm. Hg) in a yield of 80%.

EXAMPLE 4

A mixture of 2.3 parts of ethanol, 3.0 parts of cyclohexyl isonitrile and 0.72 part of cuprous oxide is heated at 120° C. for 5 hours. After removing the catalyst, the reaction mixture is subjected to distillation under reduced pressure to give ethyl N-cyclohexyl formimidate boiling at 85° C. (27 mm. Hg) in a yield of 95%.

EXAMPLE 5

A mixture of 3.9 parts of isobutyl alcohol, 3.0 parts of cyclohexyl isonitrile and 0.4 part of cupric oxide is heated at 120° C. for 5 hours. The reaction mixture is then subjected to distillation to give isobutyl N-cyclohexyl formimidate boiling at 90° C. (21 mm. Hg) in a yield of 88%.

EXAMPLE 6

A mixture of 3.7 parts of tert-butanol, 3.0 parts of cyclohexyl isonitrile and 0.4 part of cupric oxide is heated at 120° C. for 5 hours.

The reaction mixture is then subjected to distillation under reduced pressure to give tert-butyl N-cyclohexyl-formimidate boiling at 93° C. (19 mm. Hg) in a yield of 91%.

EXAMPLE 7

In the same manner as in Example 2, n-butyl N-n butyl formimidate is obtained by the reaction of n-butyl alcohol and n-butyl isonitrile in a yield of 95%.

EXAMPLE 8

A mixture of 2.3 parts of ethanol, 3.0 parts of cyclohexyl isonitrile and 1.16 part of silver oxide is heated at 120° C. for 5 hours. After removing the catalyst, the reaction mixture is subjected to distillation under reduced pressure to give ethyl N-cyclohexyl formimidate boiling at 85° C. (27 mm. Hg) in a yield of 98%.

EXAMPLE 9

A mixture of 3.7 parts of n-butanol, 3.0 parts of cyclohexylisonitrile and 1.10 part of mercury oxide is heated at 120° C. for 5 hours.

After removing the catalyst, the reaction mixture is subjected to distillation under reduced pressure to give n-butyl N-cyclohexyl formimidate in a yield of 51%.

EXAMPLE 10

A mixture of 2.3 parts of ethanol, 2.9 parts of phenyl-isonitrile and 0.72 part of cuprous oxide is heated at 120° C. for 5 hours. After removing the catalyst, the reaction mixture is subjected to distillation under reduced pressure to give ethyl N-phenyl formimidate boiling at 90° to 92° C. (23 mm. Hg) in a yield of 80%.

EXAMPLE 11

A mixture of 2.3 parts of ethanol, 3.3 parts of benzyl-isonitrile and 0.72 part of cuprous oxide is heated at 120° C. for 5 hours.

After removing the catalyst, the reaction mixture is subjected to distillation under reduced pressure to give ethyl N-benzyl formimidate boiling at 80° to 81° C. (10 mm. Hg) in a yield of 85%.

EXAMPLE 12

A mixture of 5.5 parts of benzyl alcohol, 3.0 parts of cyclohexyl isonitrile and 0.32 part of copper is heated at 120° C. for 5 hours. After removing the catalyst, the reaction mixture is subjected to distillation under reduced pressure to give benzyl N-cyclohexyl formimidate boiling at 120° to 124° C. (3 mm. Hg.) in a yield of 72%.

EXAMPLE 13

A mixture of 2.3 parts of ethanol, 3.3 parts of 3,4-dichlorophenyl-isonitrile and 0.72 part of cuprous oxide is heated at 120° C. for 6 hours. After removing the catalyst, the reaction mixture is subjected to distillation under reduced pressure to give ethyl N-3,4-dichlorophenylformimidate in a yield of 88%.

EXAMPLE 14

A mixture of 2.3 parts of ethanol, 3.5 parts of p-tolyl-isonitrile and 1.0 part of cuprous oxide is heated at 120° C. for 4 hours. After removing the catalyst, the reaction mixture is subjected to distillation under reduced pressure to give ethyl N-tolylformimidate in a yield of 85%.

What is claimed is:

1. A method for producing N-substituted formimidate which comprises reacting an alcohol containing 1–10 carbon atoms, optionally being substituted by one or more of di(lower)alkylamino, halogen, lower alkoxy, lower alkoxycarbonyl, cyano(lower)alkoxy and thio(lower) alkoxy groups, with an isonitrile selected from the group consisting of (1) alkyl isonitriles containing up to 10 carbon atoms, (2) cyclohexyl isonitrile, (3) phenyl and naphthyl isonitriles and (4) phenyl(lower alkyl)isonitriles, wherein 3 and 4 are optionally substituted by lower alkyl, nitro, halogen, lower alkoxy or loweralkylamino groups, in the presence in the reaction of at least one member selected from the group consisting of copper, silver, mercury, and oxides thereof, at a temperature of from about −50° C. to about 250° C.

2. A method according to claim 1, wherein the reaction is carried out in the presence of cuprous oxide in the reaction mixture.

3. A method according to claim 1, wherein the reaction is carried out in the presence of cupric oxide in the reaction mixture.

4. A method according to claim 1, wherein the total amount of the said metal(s) or oxide(s) thereof is from about 0.1 mol percent to about 20 mol percent, calculated on the amount of alcohol.

References Cited

Saegusa et al.: Tetrahedron Letters No. 6, pp. 521–524 (February 1967).

Roger et al.: Chemical Reviews, vol. 61, pp. 181–184 (1961).

Smith: Open Chain Nitrogen Compounds, vol. 1, pp. 225–228 (1965).

BERNARD HELFIN, Primary Examiner

G. A. SCHWARTZ, Assistant Examiner